(12) United States Patent
Ulusoy et al.

(10) Patent No.: US 10,976,705 B2
(45) Date of Patent: Apr. 13, 2021

(54) SYSTEM AND METHOD FOR HIGH-QUALITY SPECKLE-FREE PHASE-ONLY COMPUTER-GENERATED HOLOGRAPHIC IMAGE PROJECTION

(71) Applicant: CY Vision Inc., Mountain View, CA (US)

(72) Inventors: Erdem Ulusoy, Sariyer/Istanbul (TR); Deniz Mengu, Sariyer/Istanbul (TR); Hakan Urey, Sariyer/Istanbul (TR)

(73) Assignee: CY Vision Inc., San Jose, CA (US)

( * ) Notice: Subject to any disclaimer, the term of this patent is extended or adjusted under 35 U.S.C. 154(b) by 242 days.

(21) Appl. No.: 16/321,338

(22) PCT Filed: Jul. 28, 2016

(86) PCT No.: PCT/TR2016/050247
§ 371 (c)(1),
(2) Date: Jan. 28, 2019

(87) PCT Pub. No.: WO2018/021984
PCT Pub. Date: Feb. 1, 2018

(65) Prior Publication Data
US 2019/0171161 A1 Jun. 6, 2019

(51) Int. Cl.
*G03H 1/08* (2006.01)
*G03H 1/32* (2006.01)
(Continued)

(52) U.S. Cl.
CPC ......... *G03H 1/0808* (2013.01); *G03H 1/0841* (2013.01); *G03H 1/32* (2013.01);
(Continued)

(58) Field of Classification Search
None
See application file for complete search history.

(56) References Cited

U.S. PATENT DOCUMENTS 4,311,999 A 1/1982 Upton et al.
7,850,306 B2 12/2010 Uusitalo et al.
(Continued)

FOREIGN PATENT DOCUMENTS

CA 2916836 A1 1/2016
JP 2003248189 9/2003
(Continued)

OTHER PUBLICATIONS

Chiu, et al., "Paper No. S7.3: Holographic Direct View System With 4K2K LCOS SLM and LED Reconstruction Light Source", "SID International Symposium Digest of Technical Papers", Sep. 1, 2015, p. 31 vol. 46, No. SI.

(Continued)

*Primary Examiner* — Jennifer D. Carruth
(74) *Attorney, Agent, or Firm* — Charles A. Lemaire; Jonathan M. Rixen; Lemaire Patent Law Firm, P.L.L.C.

(57) ABSTRACT

The present invention relates to a system and method for high quality speckle-free phase-only computer-generated holographic image projection. The present invention more particularly relates to a holographic image display system comprising a spatial light modulator to phase modulate light from at least one light source configured to illuminate said spatial light modulator and to provide a phase hologram and projection optics to project said phase modulated light to generate an image formed by said displayed hologram onto an image plane.

27 Claims, 7 Drawing Sheets

Figure 1A:
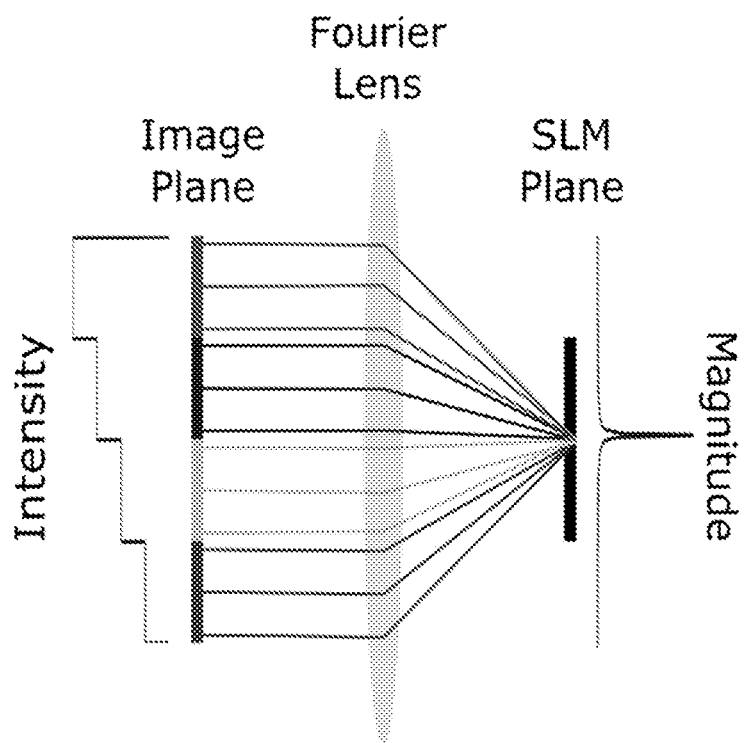

(51) Int. Cl.
    *G03H 1/22* (2006.01)
    *G03H 1/26* (2006.01)
(52) U.S. Cl.
    CPC ......... *G03H 1/2249* (2013.01); *G03H 1/2294* (2013.01); *G03H 2001/085* (2013.01); *G03H 2001/0816* (2013.01); *G03H 2001/262* (2013.01); *G03H 2001/264* (2013.01); *G03H 2001/2605* (2013.01); *G03H 2210/44* (2013.01); *G03H 2210/441* (2013.01); *G03H 2225/32* (2013.01); *G03H 2240/51* (2013.01); *G03H 2240/62* (2013.01)

(56) References Cited

U.S. PATENT DOCUMENTS

| | | | |
|---|---|---|---|
| 8,049,941 B2 | 11/2011 | Haussler | |
| 8,294,966 B2 | 10/2012 | Kroll et al. | |
| 8,400,696 B2 | 3/2013 | Ikeda et al. | |
| 8,934,160 B2 | 1/2015 | Sun | |
| 9,291,828 B2 | 3/2016 | Kroll et al. | |
| 9,383,582 B2 | 7/2016 | Tang et al. | |
| 9,406,166 B2 | 8/2016 | Futterer | |
| 9,756,317 B2 | 9/2017 | Kim et al. | |
| 9,779,643 B2 | 10/2017 | Bohn et al. | |
| 9,874,744 B2 | 1/2018 | Bailey et al. | |
| 2002/0172131 A1* | 11/2002 | Burr | G11B 7/0065 369/103 |
| 2003/0016364 A1* | 1/2003 | Thomas | G03H 1/0866 356/457 |
| 2003/0122828 A1* | 7/2003 | Lukyanitsa | H04N 13/00 345/440 |
| 2004/0227992 A1* | 11/2004 | Putilin | H04N 13/117 359/462 |
| 2005/0024754 A1 | 2/2005 | Epstein et al. | |
| 2005/0052376 A1 | 3/2005 | Shivji | |
| 2010/0149073 A1 | 6/2010 | Chaum et al. | |
| 2010/0259804 A1 | 10/2010 | Buschbeck et al. | |
| 2011/0001804 A1 | 1/2011 | Urey et al. | |
| 2011/0128471 A1 | 6/2011 | Suckling et al. | |
| 2014/0146394 A1 | 5/2014 | Tout et al. | |
| 2016/0004221 A1* | 1/2016 | Ayres | G11B 7/1362 359/22 |
| 2019/0171161 A1* | 6/2019 | Ulusoy | G03H 1/0841 |
| 2020/0103670 A1* | 4/2020 | Cole | G02B 5/20 |
| 2020/0241473 A1* | 7/2020 | Cooney | G03H 1/24 |
| 2021/0033836 A1* | 2/2021 | Yuste | G02B 26/101 |

FOREIGN PATENT DOCUMENTS

| | | |
|---|---|---|
| WO | WO 2007027019 A1 | 3/2007 |
| WO | WO 2008065569 | 6/2008 |
| WO | WO 2014063716 | 5/2014 |
| WO | WO 2014209244 | 12/2014 |
| WO | WO 2015032824 | 3/2015 |

OTHER PUBLICATIONS

Desmet, et al., "Invited Paper: Microdisplays with High Pixel Counts", "2001 SID International Symposium—Jun. 3-8, 2001, San Jose Convention Center, California", Jun. 3, 2001.

Mengu, et al., "Non-iterative phase hologram computation for low speckle holographic image projection", "Optics Express", Feb. 23, 2016, pp. 4462-4476, vol. 24, No. 5.

Michalkiewicz, et al., "Holographic three-dimensional displays with liquid crystal on silicon spatial light modulator", "Proceedings of SPIE", Jan. 1, 2004, pp. 85-94, vol. 5531.

Reichelt, et al., "Holographic 3-D Displays—Electro-holography", "In: Advances in Lasers and Electro Optics (Chapter 29) Available on internet at: http://www.intechopen.com", Apr. 1, 2010, Publisher: Intech XP055149317.

"PCT International Preliminary Report on Patentability for parent PCT/TR2016/050247 application, dated Oct. 16, 2018, 12 pages."

* cited by examiner

SYSTEM AND METHOD FOR HIGH-QUALITY SPECKLE-FREE PHASE-ONLY COMPUTER-GENERATED HOLOGRAPHIC IMAGE PROJECTION

CROSS-REFERENCE TO RELATED APPLICATION

This United States patent application is a national-phase filing of, and claims priority benefit of, PCT Patent Application No. PCT/TR2016/050247, filed Jul. 28, 2016 and titled "System and method for high-quality speckle-free phase-only computer-generated holographic image projection."

TECHNICAL FIELD OF THE PRESENT INVENTION

The present invention relates to a system and method for high quality speckle-free phase-only computer-generated holographic image projection.

BACKGROUND OF THE PRESENT INVENTION

Laser based holographic image projection (HIP) offers unique advantages over conventional projection in which a standard incoherent imaging system forms and projects a magnified image of a microdisplay. In an HIP system, the coherent diffraction field of a target image is calculated and displayed as a computer generated hologram (CGH) on a spatial light modulator (SLM) that is not necessarily conjugated to the projection plane; therefore enabling lensless projection, compact architectures, soft aberration correction, mechanical motion free multi-depth, light efficient infinite depth-of-focus operation, etc. However, such merits are partially shadowed due to the absence of full-complex SLMs (i.e., SLMs providing simultaneous and independent phase and amplitude control at each pixel).

Among currently available SLM types, phase-only liquid crystal-on-silicon (LCoS) SLMs constitute the most attractive option for HIP with their small pixel pitch, high pixel count, relatively high diffraction efficiency and 8-bit modulation depth. Yet, their restricted (phase-only) modulation capability leads to limited image quality, which is further degraded by speckle noise resulting from the coherent nature of illumination light. In this respect, performance of phase CGH computation algorithms is of crucial importance.

Phase CGH computation problem has been researched for a long time. Most formulations of the problem assume that the image is reconstructed at a Fourier plane of the SLM. The devised methods are extended in a straightforward manner for more general cases where image and SLM planes are related by Fresnel or fractional Fourier Transforms since these are essentially Fourier Transforms with pre and post multiplications with pure phase functions. In the Fourier plane formulation, if $I(x,y)$ denotes the intensity of a target image, the goal is to find a CGH $h(u,v)$ such that $|h(u,v)|^2$ is constant and $|H(x,y)|^2$ equals $I(x,y)$ as much as possible, where $H(x,y)=F\{h(u,v)\}$. A first option is to calculate an initial CGH as $$\mathscr{F}^{-1}\{\sqrt{I(x,y)}e^{j0}\}$$

(i.e., zero phase on the image) and then discard the magnitude information to obtain a pure phase CGH. This simple option performs poorly though, since $h(u,v)$ calculated as above usually exhibits a strong central peak due to the fact that typical images have a low-pass nature. In that case, image and SLM planes are located at the focal planes of a 2-f setup, and a staircase function represents the low-pass target image. The initial CGH can be considered to be obtained by illuminating the image from left to right with a normally incident plane wave (parallel rays) and backtracing these rays to the SLM plane. The low-pass nature of $$\sqrt{I(x,y)}e^{j0}$$

creates almost negligible diffraction spread, so all the rays leaving the image plane essentially remain at normal incidence and get focused at the right focal point of the Fourier lens, leading to a CGH with the strong central peak discussed above. Such a CGH leads to a large error in the form of a strong high-pass filter effect (since high frequency information is boosted relative to low-frequency information) when the magnitude information is discarded.

A better option, and the most common approach, is to obtain an initial CGH as $h(u,v)$ equals $$\mathscr{F}^{-1}\{\sqrt{I(x,y)}e^{j\phi(x,y)}\}$$

where $\varphi(x,y)$ is a random function. This approach optically corresponds to the placement of a random diffuser on the image plane that shuffles the ray directions, and creates a CGH with a more uniform energy distribution, as illustrated. This technique, upon direct quantization, leads to a smaller error and a better reconstruction. However, the introduction of the random diffuser causes significant speckle noise. Usually, further iterations are carried out back and forth between SLM and image planes to improve image quality, as in Gerchberg-Saxton or iterative Fourier transform (IFTA) type algorithms. However, in such solutions, convergence is rather slow and speckle effects persist to a non-negligible extent at the final image. Fine-up with don't care (FIDOC) algorithms reduce speckle noise and facilitate convergence considerably but only at the cost of reduced field of view (FOV) and decreased light efficiency by sparing part of the available image area to distribute quantization noise.

A third approach is to obtain an initial CGH in the form of $h(u,v)$ as $$\mathscr{F}^{-1}\{\sqrt{I(x,y)}e^{j\pi\alpha(x^2+y^2)}\}$$

(i.e., impose a quadratic phase function (QPF) on the image). By suitably adjusting the $\alpha$ parameter of the QPF, the image can bit fitted in the SLM aperture in a 1-1 mapping fashion. Optically, this approach corresponds to the placement of a thin lens at the image plane. The focal length of the lens is controlled by $\alpha$. Similar to the random phase case, the initial CGH has a better distribution of energy. Moreover, the non-random nature of the applied phase term (the ordered mapping between image and SLM points) leads to significant speckle reduction. However, direct quantization leads again to poor results since the energy distribution is not uniform, due to the fact that the image intensity is not necessarily uniform. Subsequent algorithms such as Error Diffusion (ED) improve reconstructions again only when image size and light efficiency are reduced.

According to the present invention, a distinct phase CGH computation method is presented, the method of the invention is advantageous over the previously discussed cases in that an initial CGH that is already very close to a phase-only function is computed and subsequent iterations converge quickly to unprecedently low-error phase CGHs whose reconstructions are almost speckle-free. The method also works for full FOV (i.e. does not require a partitioning of available image area among signal and noise windows) and thus provides maximum light efficiency.

OBJECTS OF THE PRESENT INVENTION

One of the objects of the present invention is to provide a phase CGH computation method exhibiting an improved performance in terms of image quality.

Another object of the present invention is to provide a phase CGH computation method that does not compromise in image field of view and light efficiency.

Further an object of the present invention is to provide a phase CGH computation method that which makes it possible to achieve unprecedentedly low-error (about 20× decrease compared to existing methods) and speckle-free reconstructions for full FOV target images with much facilitated convergence behavior.

SUMMARY OF THE PRESENT INVENTION

According to the present invention, a phase CGH computation method is presented, in which (a) an initial image specific phase term is designed, (b) said initial image specific phase term is imposed on the target image and an initial CGH is computed, (c) the initial CGH is used as the starting point of iterations. The merit of the method of the invention over the previously discussed cases is that, the initial CGH computed in step (b) is already very close to a phase-only function (thanks to the image specific initial phase term in step (a)), therefore, the iterations in step (c) converge quickly to unprecedently low-error phase CGHs whose reconstructions are almost speckle-free. The method also works for full FOV (i.e. does not require a partitioning of available image area among signal and noise windows) and thus provides maximum light efficiency.

BRIEF DESCRIPTION OF THE FIGURES OF THE PRESENT INVENTION

Accompanying drawings are given solely for the purpose of exemplifying an object reconstruction system, whose advantages over prior art were outlined above and will be explained in brief hereinafter.

The drawings are not meant to delimit the scope of protection as identified in the claims nor should they be referred to alone in an effort to interpret the scope identified in said claims without recourse to the technical disclosure in the description of the present invention.

FIG. 1 demonstrates the effect of the initial phase function imposed on a typical low-pass target image prior to the computation of a phase CGH. a) No (constant) phase results in a CGH with a strong concentration of energy that leads to a large error when magnitude information is discarded (i.e. direct quantization) to obtain a phase CGH. b) A random phase (optically equivalent to a random diffuser) leads to a CGH with a better distribution of energy and thus lower error. The shuffled nature though results in high speckle noise. c) A quadratic phase function (QPF, optically equivalent to a lens) leads to a CGH with an ordered but not necessarily uniform distribution of energy. Thus, speckle noise is suppressed, but there is still non-negligible error. d) Proposed phase term (optically equivalent to block specific lenses and prisms) that results in a CGH with an almost uniform and ordered distribution of energy (i.e. a CGH that is readily phase-only) leading to speckle-free high quality reconstructions.

Figure 1B:
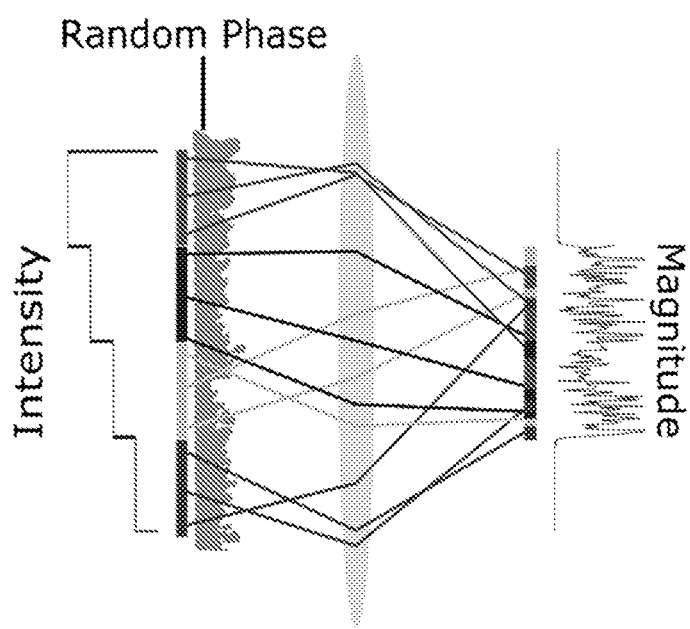
Figure 1C:
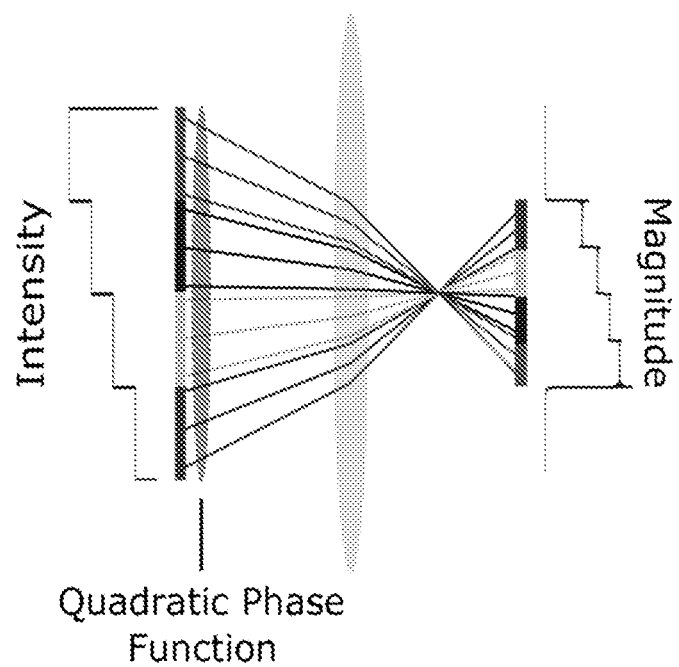
Figure 1D:
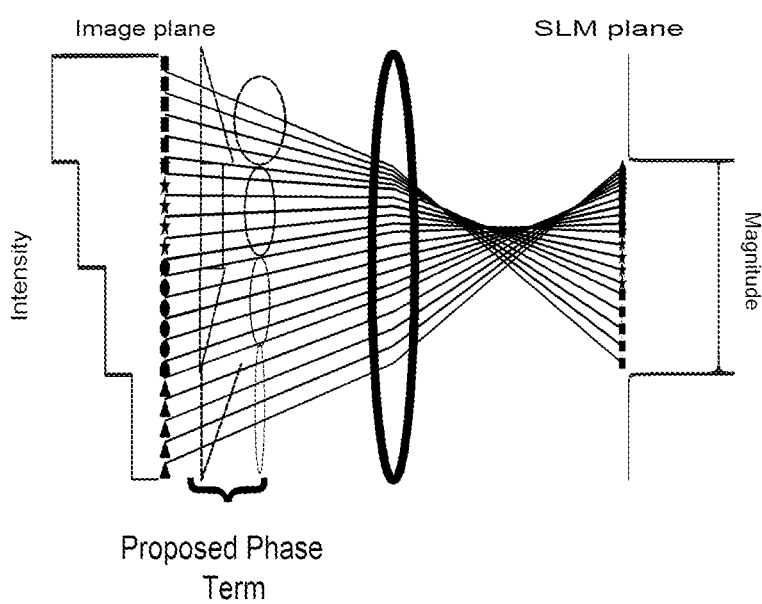
Figures 2A, 2B:
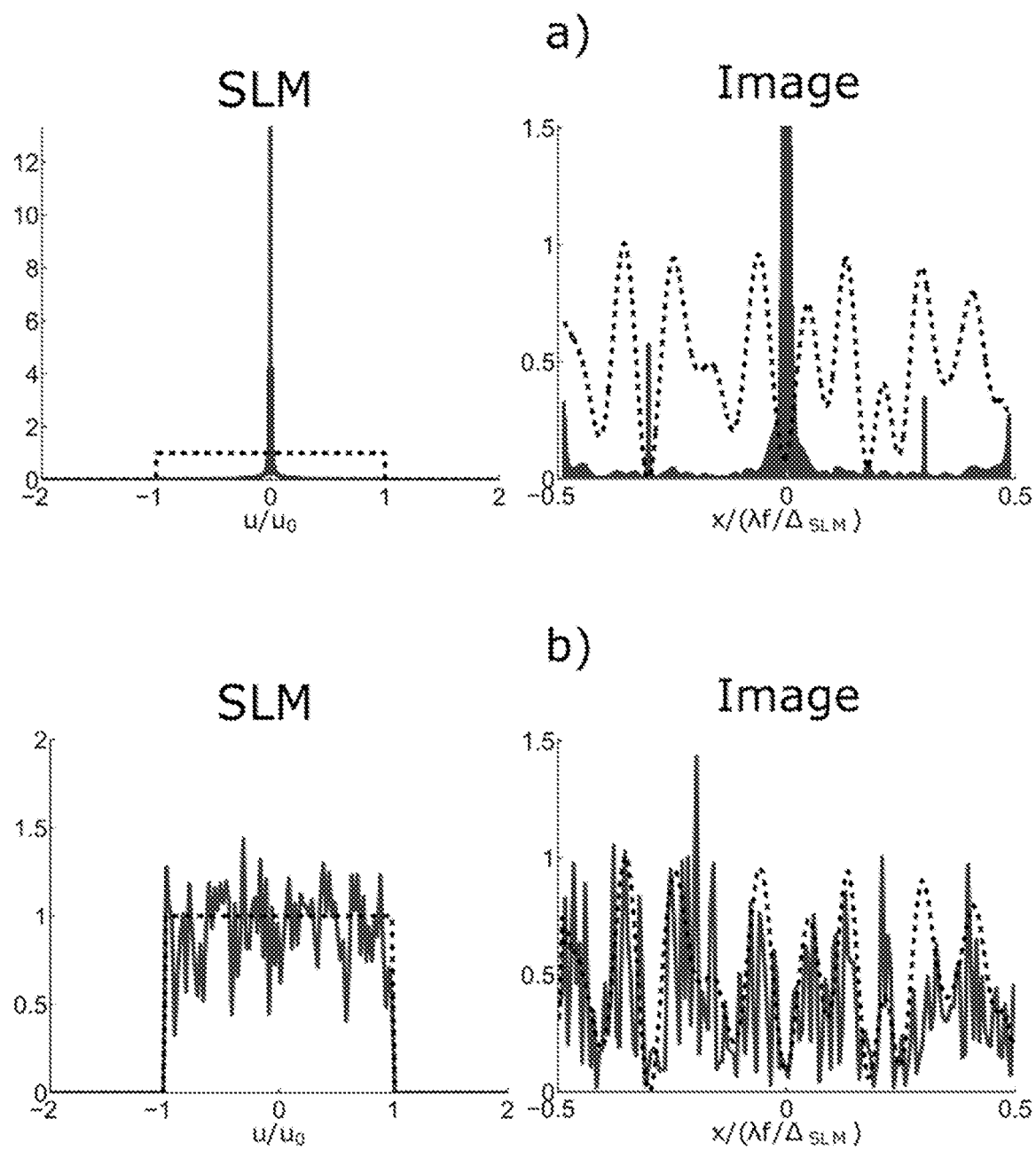
Figures 2C, 2D:
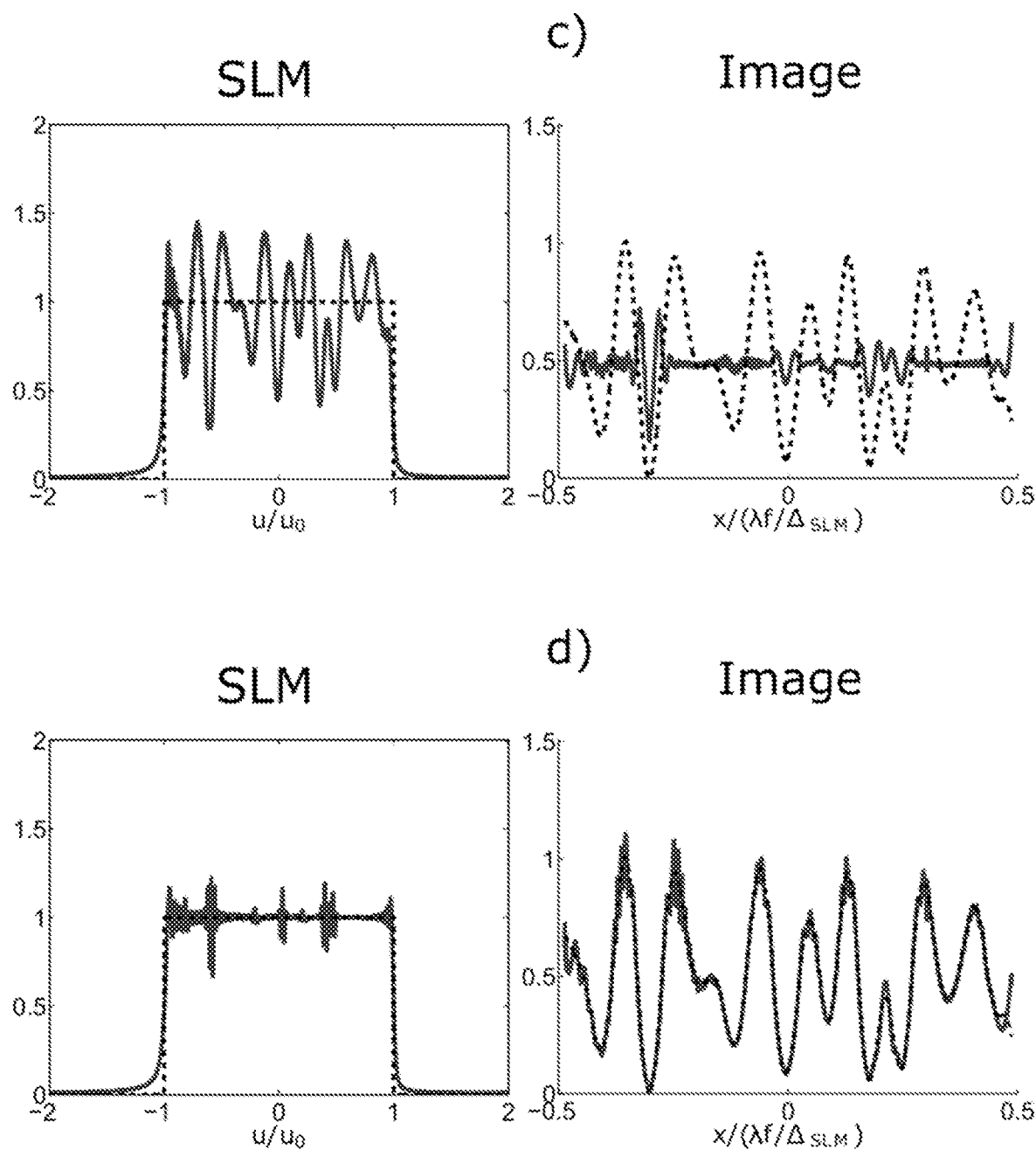

FIG. 2 shows one-dimensional simulations that verify the four cases illustrated in FIG. 1a: No (constant) phase function is imposed on the target image. The magnitude of the resulting wavefield on the SLM plane is shown on the left. The dashed rectangle indicates the SLM aperture. The reconstruction performed by the phase CGH (obtained by direct quantization) is shown on the right. The dashed curve shows the ideal target image. In FIG. 1b, 1c and 1d, the simulations when the phase functions applied on the target image are random, QPF and the proposed phase term are shown respectively.

Figure 3:
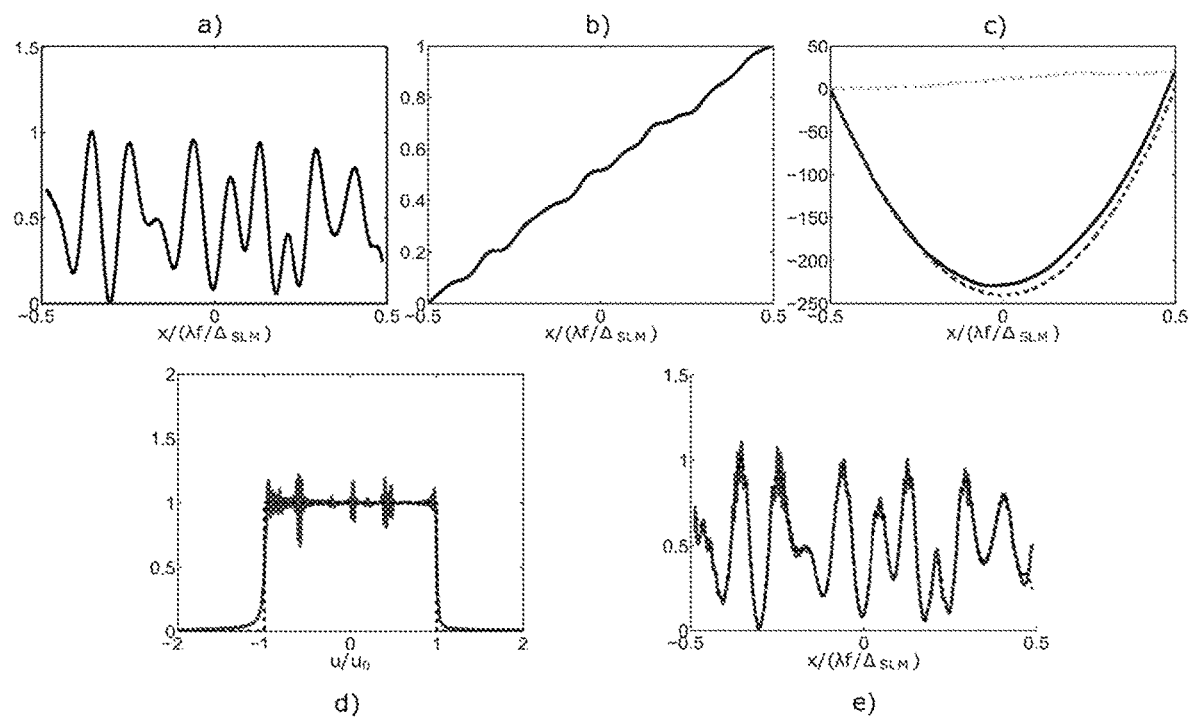

FIG. 3 demonstrates the application of the proposed method in the 1D signal domain. a) Intensity of the target image. b) The associated cumulative distribution function (CDF) as computed in Eq. (6). c) The phase function $\varphi(x)$ computed as in Eq. (7) (intermediate curve) and imposed on the target image. The lower curve shows a QPF to serve as a reference, with the upper curve showing the difference. d) Magnitude of the resulting wavefield on the SLM plane, that is almost uniform in the SLM aperture. e) The intensity reconstructed by the phase CGH obtained by direct quantization.

Figure 4:
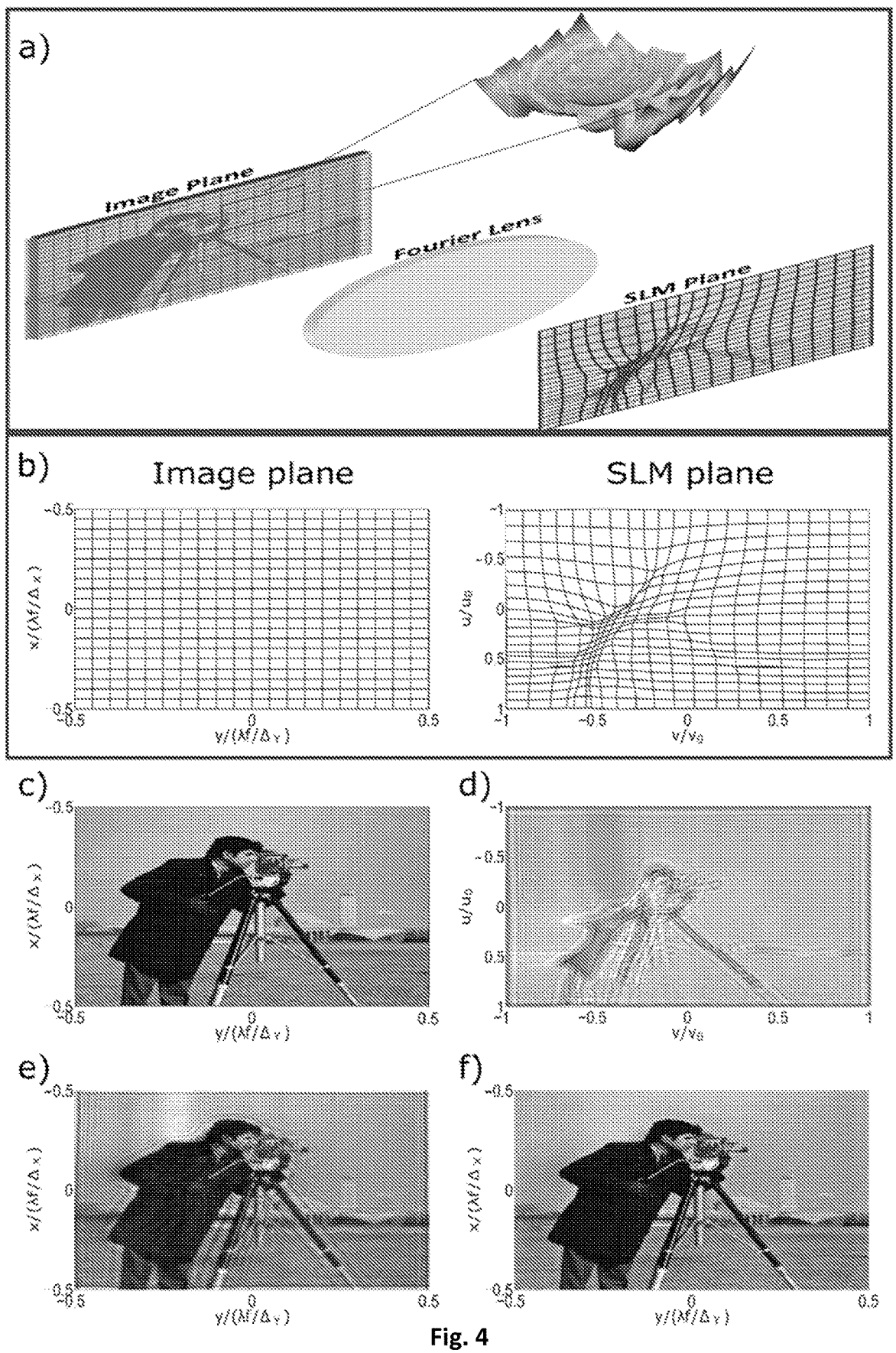

FIG. 4 illustrates the proposed method in the 2D signal domain. a) The target image is divided into rectangular blocks. An off-axis lens is imposed on each block. The lenses map the image plane to the SLM plane with a geometrical distortion that uniformizes the energy distribution. b) The rectangular image blocks are mapped into non-overlapping quadrilaterals. The area of each quadrilateral is proportional to the energy content of the associated image block. c) Target image, Cameraman. d) The magnitude of the CGH obtained by the designed image specific phase term. e) Reconstruction obtained with direct quantization. f) Reconstruction after 20 IFTA iterations.

Figure 5:
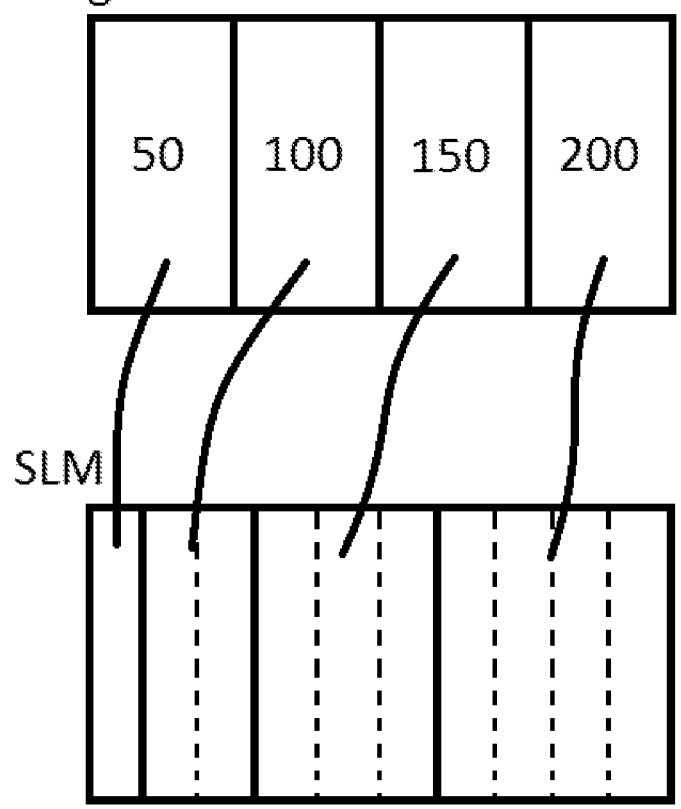

FIG. 5 demonstrates an exemplary test image consisting of 4 equally sized vertical blocks, such that from left to right, the blocks having constant intensity values of 50, 100, 150 and 200.

DETAILED DESCRIPTION OF THE PRESENT INVENTION

According to the present invention, a phase CGH computation method is presented, in which (a) an initial image specific phase term is designed, (b) said initial image specific phase term is imposed on the target image and an initial CGH is computed, (c) the initial CGH is used as the starting point of iterations.

According to the present invention, the target image is first divided into a number of blocks (four in reference to FIG. 1, one for each stair of the image). Then, for each block, a separate phase function is designed, consisting of prisms and lenses with custom tilt angles and focal lengths. The prisms and lenses are designed such that each block is mapped on an SLM region with an area proportional to its energy content. For instance, the purple block, having the highest energy content, is mapped to the largest SLM area, while the red block, having the smallest energy content, is mapped to the smallest SLM area. In this way, it is ensured that the energy distribution on the SLM plane is almost uniform. Therefore, the resulting CGH is almost readily phase-only, leading to quite small error even when directly quantized. The fact that the image plane is mapped in an orderly manner on the SLM plane (rather than in a random manner) also ensures that speckle noise is kept minimal.

The mathematical background of the method of the present invention in the one-dimensional (1D) signal domain can be presented as follows. As shown in FIG. 1, assuming the image planes are located at the two focal planes of a lens, it can be noted that the complex transmittance of the SLM and the wavefield on the image plane are denoted by h(u) and H(x), respectively. The SLM is illuminated by a normally incident plane wave of wavelength A. The Fourier lens has a focal length f, where for simplicity A f is taken as equal to 1 (other cases can be handled trivially with a coordinate normalization). Thus, the simple FT and IFT relations are as follows:

$$H(x)=\int_{-\infty}^{\infty}h(u)e^{-j2\pi ux}du, \quad (1)$$

$$h(u)=\int_{-\infty}^{\infty}H(x)e^{j2\pi xu}dx, \quad (2)$$

Assuming that the SLM has a finite size and a finite bandwidth, $h(u)=0$ outside the $u \in (-u_0, u_0)$ interval, and the uniquely addressable image area is limited to the $x \in (-x_0, x_0)$ interval. In the case of a phase-only SLM, $|h(u)|^2 = c$ where c is a real positive constant for $u \in (-u_0, u_0)$, and it is desired to have $|H(x)|^2 = I(x)$ for $x \in (-x_0, x_0)$, where I(x) denotes the intensity of the target image. As stated above, the method in accordance with the present invention comprises the design of an image specific phase term $\varphi(x)$ such that the image plane wavefield that equals:

$$H(x)=\sqrt{I(x)}e^{j\phi(x)}$$

almost readily corresponds to an SLM plane wavefield h(u) where $|h(u)|^2$ is as constant as possible within the SLM aperture.

As $\varphi(x)$ influences the energy distribution of h(u), for a smoothly varying $\varphi(x)$, the function H(x) that is:

$$H(x)=\sqrt{I(x)}e^{j\phi(x)}$$

can be interpreted as an amplitude modulation (AM) signal, where $$\sqrt{I(x)}$$

represents the envelope and $e^{j\varphi(x)}$ represents the carrier signal with a space-dependent modulation frequency. When I(x) (and thus the envelope) has a sufficiently narrow bandwidth (which is the case for typical images encountered in projection applications, as stated earlier), the frequency content of H(x) is mainly determined by $e^{j\varphi(x)}$ (by way of example, the extreme case of I(x)=1 can be considered). In particular, it can be supposed that at some point $x_p \in (-x_0, x_0)$, the instantaneous frequency of $e^{j\varphi(x)}$, defined as:

$$u_{IF}(x) = \frac{1}{2\pi}\frac{d}{dx}\phi(x) \quad (3)$$

is equal to $u_p = u_{IF}(x_p)$. Then, the part of the image plane around $x_p$ is essentially mapped around up on the SLM plane. Thus, $\varphi(x)$ actually performs a mapping between image plane and SLM plane coordinates. This mapping is 1-1 if $\varphi(x)$ is designed such that $u_{IF}(x)$ is monotonically increasing. From an optics perspective, $\varphi(x)$ determines the local ray angle distribution on the image plane, as illustrated in FIG. 1. The next part refers to the question of which mapping distributes the energy of the image as uniformly as possible on the SLM plane.

In reference to the question above, a quantum optics perspective is invoked where the spatial coordinates U and X are interpreted as random variables (RVs) and $|h(u)|^2$ and $|H(x)|^2$ are interpreted as the associated probability density functions (PDFs) denoting the likelihood of detecting a photon at a particular spatial position (following appropriate amplitude normalizations). The fact that $|h(u)|^2=c$ implies that U is a uniform RV. In this respect, the designed phase term $\varphi(x)$ is expected to map the RV X characterized by the PDF $|H(x)|^2=I(x)$ to a uniform RV.

A well-known theorem from probability theory states that if U denotes a RV distributed uniformly in (0,1), and if X is another RV with a PDF given by $p_X(x)$, then X can be generated from U by the mapping:

$$Z=C_X^{-1}(U) \quad (4)$$

where $$C_X(x)=\int p_X(x)dx$$

denotes the cumulative distribution function (CDF) of X. Conversely, U can be generated from X by the mapping:

$$U=C_X(X), \quad (5)$$

In summary, (1) $\varphi(x)$ establishes a mapping between image and SLM plane coordinates, (2) $|h(u)|^2$ and $|H(x)|^2$ can be viewed as PDFs, and (3) a RV X is mapped to a uniform RV if it is input to its CDF function as $C_x(X)$. Combining these three pieces, it is indicated that if a $\varphi(x)$ is designed such that $u_{IF}(x)$ as given in Eq. (3), after appropriate normalizations, is equal to the CDF function $$\int I(x)dx$$

then a CGH with a magnitude almost uniformly distributed over the SLM aperture is obtained. More precisely, $$C_I(x) = \frac{\int_{-x_0}^{x}I(x')dx'}{\int_{-x_0}^{x_0}I(x')dx'} \quad (6)$$

for $x \in [-x_0, x_0]$. Thus, $C_I(x)$ denotes the CDF corresponding to the target image, with $C_I(-x_0)=0$ and $C_I(x_0)=1$, as expected. Next, it can be designed an image specific phase function that is given as:

$$\phi(x)=2\pi u_0(2\int_{-x_0}^{x}C_I(x')dx'-x) \quad (7)$$

for $x \in [-x_0, x_0]$. Then, by Eq. 3, the instantaneous frequency becomes $$u_{IF}(x)=u_0(2C_I(x)-1). \quad (8)$$

For $x \in [-x_0, x_0]$, $u_{IF}(x) \in [-u_0, u_0]$ with $u_{IF}(-x_0)=u_0$, $u_{IF}(x_0)=u_0$. Also, $u_{IF}(x_2) \geq u_{IF}(x_1)$ for $x_2 \geq x_1$, i.e., $u_{IF}(x)$ is monotonically increasing. Thus $\varphi(x)$ actually maps the target image on the SLM aperture in a 1-1, onto fashion. Moreover, the image energy is distributed almost uniformly on the SLM plane, since the mapping is equivalent to that in Eq. (5).

FIG. 3 illustrates and verifies the described procedure. FIG. 3(a) shows an exemplary, one-dimensional target image I(x) that is sufficiently low-pass. FIG. 3(b) shows the associated CDF, $C_I(x)$, found as in Eq. (6). The designed phase function $\varphi(x)$, computed as in eq. (7), is shown by the curve in FIG. 3(c). To provide a comparison, on the same figure there is included the QPF (the lower parabola) which corresponds to the case I(x)=1. The uppermost curve shows the difference between the other two curves. This figure emphasizes that ordinarily the designed phase functions deviate little from a QPF, but that little deviation has profound effects. In FIG. 3(d), the magnitude of the SLM field, h(u), computed as in Eq. 2 is shown. As expected, h(u)

is almost readily a phase-only function that also fits in the SLM aperture (indicated by dashed curve). The mere deviations from uniform magnitude behavior are in the form of ripples caused by rapidly falling or rising parts of the target image (i.e., those parts that slightly have a high frequency content). Finally, FIG. 3(e) illustrates the reconstructed intensity $|H(x)|^2$ on the desired dashed curve when h(u) in FIG. 3(d) is directly quantized into a phase-pattern by setting the magnitude to unity within the SLM aperture and to zero outside. As can be seen, a successful reconstruction that is also free of speckle noise is performed.

If the block based view depicted in FIG. 1 is extended to the 2D case, again the following steps are performed: (1) the phase term designed and imposed on the image establishes a mapping between image and SLM plane coordinates through instantaneous frequencies, (2) image and SLM plane intensities are interpreted as PDFs, (3) the mapping is designed to map the arbitrary image plane PDF to the uniform SLM plane PDF. In this way, the energy on the image plane is distributed as uniformly as possible (so that phase quantization error becomes small) and in an ordered manner (so that speckle noise is avoided as much as possible) on the SLM plane.

With the inclusion of the second spatial dimension, the designed phase term φ(x,y) is now characterized by two instantaneous frequencies, one for each spatial dimension, as:

$$u_{IF}(x, y) = \frac{1}{2\pi}\frac{\partial}{\partial x}\phi(x, y), \; v_{IF}(x, y) = \frac{1}{2\pi}\frac{\partial}{\partial y}\phi(x, y). \quad (9)$$

These frequencies now determine mappings between image coordinates (x,y) and SLM coordinates (u,v). The second difference from the 1D case arises in the fact that $|h(u,v)|^2$ and $|H(x,y)|^2=I(x,y)$ are interpreted as joint PDFs rather than marginal PDFs. In this respect, φ(x,y) maps the jointly distributed RV pair (X,Y) (characterized by I(x,y)) to the jointly distributed RV pair (U,V). By $|h(u,v)|^2=c$, U and V are independent RVs, each having a uniform distribution. However, in general, X and Y are not independent unless I(x,y) is separable as $I(x,y)=I_X(x)I_Y(y)$, which is the only case the 1D formulation above can be applied independently along the two dimensions.

For a general joint PDF, the mapping of the RV pair (X,Y) to (U,V) can be accomplished in several ways. One alternative is the following mapping:

$$U=C_{X|Y}(X,Y), V=C_Y(Y) \quad (10)$$

where $C_Y(y)$ denotes the marginal CDF of Y, and $C_{X|Y}(X,Y)$ denotes the conditional CDF of X given Y.

A φ(x,y) is determined such that:

$$u_{IF}(x,y)=u_0(2C_{X|Y}(y,y)-1) \quad (11)$$

$$v_{IF}(x,y)=v_0(2C_Y(y)-1), \quad (12)$$

However, for an analytical function φ(x,y) that satisfies Eq. 11 and Eq. 12 at all (x,y), it is known that for an analytical function the mixed partial derivatives should be equal to each other, i.e., $\partial^2\varphi/\partial x\partial y=\partial^2\varphi/\partial y\partial x$. In general that property is not satisfied by the $u_{IF}(x,y)$ and $v_{IF}(x,y)$ above. In other words, it is in general not possible to find a 2D counterpart for Eq. 7.

Based on this, the method of the present invention is extended to 2D signals with the block based view that provides an approximate solution. This view, for the 2D case, is illustrated in FIG. 4a. As can be seen, the image plane is divided into a number of rectangular blocks. Then, similar to that in FIG. 1, an off-axis lens term is designed for each of the blocks, as shown in the inset. With these lenses, each block is essentially mapped on a particular patch on the SLM plane. FIG. 4b illustrates this mapping for some selected blocks on the image plane. It is to be noted that the patches in general have a quadrilateral shape. Patches for different blocks do not overlap, and the patches altogether cover the entire SLM area. In addition, the area of each patch is proportional to the energy content of the corresponding block. As a result, the target image is mapped on the SLM aperture in a geometrically distorted form such that the image energy distribution on the SLM plane is as uniform as possible. This fact is illustrated in FIG. 4c and FIG. 4d. FIG. 4c shows the Cameraman as the target image, while FIG. 4d shows the magnitude of the SLM field. It is to be noted that though the coat of the cameraman (corresponding to a low energy portion) covers a large area on the image plane, it is squeezed significantly on the SLM plane.

In the block based processing, the vertex coordinates of blocks are first inserted into Eq. 11 and Eq. 12 and the corresponding vertex locations on the SLM plane are determined, as in FIG. 4b. Then, on the $k^{th}$ block, a phase function of the following form is fitted:

$$\phi^k(x, y) = \sum_{m=0}^{2}\sum_{n=0}^{2} \alpha_{m,n}^k x^m y^n, \quad (13)$$

which in general represents an off-axis, astigmatic, aberrated lens. It is noted that for this lens term, there are altogether 9 coefficients:

$\alpha_{m,n}^k$

The instantaneous frequencies in Eq. 11 and Eq. 12 respectively become:

$$\frac{1}{2\pi}\sum_{m=1}^{2}\sum_{n=0}^{2} m\alpha_{m,n}^k x^{m-1} y^n \text{ and } \frac{1}{2\pi}\sum_{m=0}^{2}\sum_{n=1}^{2} n\alpha_{m,n}^k x^m y^{n-1}$$

To determine the coefficients, two equations are written for each vertex of the image block (one for each instantaneous frequency). In this manner, altogether 8 equations are obtained from which 8 of $\alpha_{m,n}^k$ are determined except for $\alpha_{0,0}^k$ Here, in general the equation set may not have a solution (due to the fact that mixed derivatives are not equal), thus the equations are solved in the minimum-least squared sense. The undetermined $\alpha_{0,0}^k$ is adjusted to ensure that the overall phase function is continuous and does not lead to diffraction artifacts in the final reconstruction. A CGH is finally obtained by performing an IFT on the target image superimposed by the designed phase function.

Although φ(x,y) designed as described above performs the mapping in Eq. 10 approximately, the reconstructions obtained by direct quantization of the computed CGHs are still acceptable when a sufficiently large number of blocks are used. In this case, the calculated CGH serves as a quite useful initial point for iterative algorithms, enabling the achievement of substantially minor error values with significantly facilitated convergence.

The method of the present invention can be tested in the following manner: Considering a test image consisting of four equally sized vertical blocks such that from left to right, the blocks have constant intensity values of 50, 100, 150 and 200 (upper portion of FIG. 5), if the total energy of the first block is U, the second, third and fourth blocks have energies 2U, 3U and 4U, respectively. The total image energy is equal to 10U. When the proposed phase CGH computation method is used, the four image blocks are mapped to four vertical SLM blocks as in the lower portion of FIG. 5, such that if the first block has an area of A, second, third and fourth SLM blocks have areas 2A, 3A and 4A, respectively. In this way, image energy is uniformly distributed on the SLM plane. It is to be noted that the total SLM area is 10A.

Supposing a blocker of area 3A is placed on the SLM such that the light emerging from the SLM region corresponding to the third image block is blocked, then the third image block with energy 3U gets darkened, while the other image blocks will remain unaffected.

The method of the present invention can also be extended to non-paraxial optical configurations. In optical configurations involving fast and low f-number components, the mathematical relation between the SLM and image planes are not described accurately by a Fourier, Fresnel or fractional Fourier transform, which mainly pertain to paraxial cases. In such non-paraxial configurations, the precise mathematical relations are more complex and account for aberrations and distortions.

When phase CGHs that are computed with paraxial optics formulas are used in non-paraxial configurations, the generated images suffer from aberrations and distortions, which become more severe as the field of view of the system is increased.

Optical aberrations and distortions in a wavefront are represented with phase functions. The local frequencies of those phase functions, given by the gradient of the phase function, represent deviations from ideal paraxial ray angles. The presented phase CGH computation method can be extended to cover non-paraxial cases in several ways.

In a first solution, a phase CGH can be computed according to the proposed method by assuming a perfect Fourier, Fresnel, or fractional Fourier transform between the SLM and image planes. Then, an additional phase function can be imposed on the phase CGH to compensate for the aberrations and distortions of the actual non-paraxial system. The additional phase function can be found by performing a ray trace analysis of the non-paraxial system to obtain the ray angle distribution on the image plane formed by a point source placed at the center of the SLM plane. On the image plane, the ray angle distribution can be considered as a gradient specification, to which a polynomial can be fitted. The fitted polynomial represents the phase function that compensates for the aberrations of the system. This method is effective for small degree of aberrations.

When aberrations in the configuration are more severe, the first method falls short of generating high image quality at the peripheral parts of the image plane.

In a second solution, the method starts as described by dividing the target image into a number of blocks. Then, for each vertex on the image plane, a corresponding vertex point on the SLM plane is found, such that the mapping between the image blocks and SLM blocks lead to an almost uniform distribution of energy, as in the original method, independent of the non-paraxial optical configuration. Next, for each image vertex, a ray is found such that the ray starts from the image vertex and lands on the corresponding SLM vertex. In this way, for each image block, four rays are found. Then, a phase term for each image block is designed such that the surface normal at each vertex is equal to the associated ray angle. The overall phase term is imposed on the image, and a phase function is found by propagating the wave on the image plane to the SLM plane to obtain an initial CGH. The initial CGH obtained in this manner almost has a uniform magnitude. The initial phase CGH can be obtained by discarding the magnitude information. If desired, further iterations can be performed between the SLM and image planes to refine the phase CGH and increase image quality.

In accordance with the present invention, the image plane can be formed on retina, a projection screen or an intermediate image plane in between optical components. Further, the energy content can be defined in terms of image intensities as regards to pixels in each block for each wavelength. This can be typically the case for each wavelength for instance separately for red green blue colors.

Furthermore, holographic projection display can be realized in a time-sequential manner or free shuttered spatial light modulators can be used one for each color so as to be used in a combined manner.

In a nutshell, the present invention proposes a holographic image display system comprising a spatial light modulator to phase modulate light from at least one light source configured to illuminate said spatial light modulator.

In one embodiment of the present invention, an image plane is divided into a plurality of image blocks and a phase function is designed for each block.

In a further embodiment of the present invention, said image blocks are multiplied by the phase function to obtain an image plane wavefield in the manner that a phase hologram to be written on the spatial light modulator is computed using said image plane wavefield.

In a further embodiment of the present invention, each image block of said image plane is mapped on a particular spatial light modulator region on the plane of said spatial light modulator.

In a further embodiment of the present invention, the area of each of said spatial light modulator regions is proportional to the energy content of the corresponding image block of said image plane.

In a further embodiment of the present invention, said phase function consists of two dimensional polynomial terms.

In a further embodiment of the present invention, a separate phase function is designed in the manner that an image plane wavefield substantially corresponds to a respective spatial light modulator plane wavefield with a uniform distribution of energy and said separate phase function performs a mapping between image plane and spatial light modulator plane coordinates.

In a further embodiment of the present invention, said phase hologram to be written on the spatial light modulator is computed in the manner that the image plane wavefield is back propagated to the spatial light modulator plane and then by discarding magnitude information.

In a further embodiment of the present invention, said phase hologram is computed in the manner that the image plane wavefield is back propagated to the spatial light modulator plane and then by discarding magnitude information and performing iteration.

In a further embodiment of the present invention, said iterations are performed according to IFTA algorithm, error diffusion, Gerchberg-Saxton or Fresnel Ping-Pong.

In a further embodiment of the present invention, image and spatial light modulator plane intensities are identified as probability distribution functions and each block of said image plane is mapped on the particular spatial light modulator region in the manner that arbitrary image plane probability distribution function is mapped to a uniform spatial light modulator plane probability distribution function.

In a further embodiment of the present invention, each vertex at the intersection point of a plurality of image blocks on the image plane corresponds to a spatial light modulator vertex at the intersection point of a plurality of spatial light modulator regions, each of said regions corresponding to the analogously same image block on the image plane.

In a further embodiment of the present invention, each vertex connecting respective lateral edges of a number of image blocks on the image plane corresponds to a spatial light modulator vertex connecting analogously same lateral edges of a number of spatial light modulator regions.

In a further embodiment of the present invention, said image plane is divided into a plurality of rectangular blocks.

In a further embodiment of the present invention, said image plane is divided into a plurality of hexagonal blocks.

In a further embodiment of the present invention, said image plane is divided into a plurality of triangular blocks.

In a further embodiment of the present invention, image plane is divided into a plurality of rectangular, hexagonal, triangular blocks or a combination thereof.

In a further embodiment of the present invention, an aberrated off-axis lens term is designed for each of said blocks.

In a further embodiment of the present invention, said phase function includes linear, quadratic or higher order terms.

In a further embodiment of the present invention, said phase function designed for each image block functions in the form of prisms or lenses with separate tilt angles and focal lengths.

In a further embodiment of the present invention, a computer generated hologram is generated by performing a Fourier transform, Fresnel transform and/or fractional Fourier transform on the image superimposed by the designed phase function.

In a further embodiment of the present invention, said regions on the plane of said spatial light modulator have a quadrilateral shape.

In a further embodiment of the present invention, said spatial light modulator regions for different image blocks are configured in a non-overlapping manner.

In a further embodiment of the present invention, and the spatial light modulator regions altogether cover the entire spatial light modulator area.

In a further embodiment of the present invention, an image is mapped on the spatial light modulator aperture in a geometrically distorted form such that the energy distribution of the initial computer generated hologram on the spatial light modulator plane is substantially uniform.

In a further embodiment of the present invention, if image plane intensity is separable, iteration-free construction is performed by directly imposing the phase function obtained as the multiplication of the one dimensional phase functions obtained by integrating the cumulative distribution functions of one-dimensional separable intensity functions.

In a further embodiment of the present invention, an additional phase function is imposed on the computer generated phase hologram to compensate for the aberrations and distortions of a non-paraxial system.

In a further embodiment of the present invention, said additional phase function is found by performing a ray trace analysis of said non-paraxial system to obtain the ray angle distribution on the image plane formed by a point source placed at the center of the spatial light modulator plane.

In a further embodiment of the present invention, for each vertex on the image plane, a corresponding vertex point on the spatial light modulator plane is found such that the mapping between the image blocks and spatial light modulator regions lead to a substantially uniform distribution of energy.

In a further embodiment of the present invention, for each image vertex, a ray is found such that the ray starts from the image vertex and lands on the corresponding spatial light modulator vertex.

In a further embodiment of the present invention, for each image block, four rays are found and a phase term for each image block is designed such that the surface normal at each vertex is equal to the associated ray angle.

In a further embodiment of the present invention, an overall phase term is imposed on the image, and a phase function is found by propagating the wave on the image plane to the spatial light modulator plane to obtain an initial computer generated hologram.

In a further embodiment of the present invention, a head-wearable device comprising the holographic image display system is proposed.

In a further embodiment of the present invention, said head-wearable device consists of an intermediate image plane on which a holographic projection is made.

In a further embodiment of the present invention, image projected to said intermediate image plane is viewed by eyepiece optics.

In a further embodiment of the present invention, a method for generating a holographic image is proposed, the method comprising the steps of phase modulating light from at least one light source by a spatial light modulator, said at least one light source being configured to illuminate said spatial light modulator; dividing an image plane into a plurality of image blocks and designing a phase function consisting of two dimensional polynomial terms for each block; multiplying said image blocks by the phase function to obtain an image plane wavefield in the manner that a phase hologram to be written on the spatial light modulator is computed using said image plane wavefield; mapping each image block of said image plane on a particular spatial light modulator region on the plane of said spatial light modulator in the manner that the area of each of said spatial light modulator regions is proportional to the energy content of the corresponding image block of said image plane.

The invention claimed is:

1. A holographic image-display system comprising:
a spatial light modulator to phase modulate light from at least one light source configured to illuminate the spatial light modulator;
a processing unit configured to divide an image plane into a plurality of image blocks and form a separate phase function having two-dimensional polynomial terms for each block, wherein a target image is mapped on the spatial light modulator aperture in a geometrically distorted form such that the energy distribution of the initial computer-generated hologram on a plane of the spatial light modulator is substantially uniform,
wherein the processing unit is further configured to multiply the image blocks by the phase function to obtain an image plane wavefield which, with backpropagation, generates an initial computer-generated hologram with a substantially uniform energy distribution, to constitute the source of a phase hologram to be written on the spatial light modulator, wherein the processing unit is further configured to compute the phase hologram to be written on the spatial light modulator followed by discarding magnitude information to obtain pure phase, wherein the processing unit is further configured to map each image block of the image plane on a particular spatial light modulator region on the plane of the spatial light modulator using the separate phase function, and wherein the area of each of the spatial light modulator regions is proportional to the energy content of the corresponding image block of the image plane.

2. The holographic image display system as set forth in claim 1, wherein the processing unit is configured to perform subsequent iterations on an initial phase-only computer-generated hologram according to an IFTA algorithm, an error diffusion algorithm, a Gerchberg-Saxton algorithm or a Fresnel Ping-Pong algorithm.

3. The holographic image display system as set forth in claim 1, wherein the processing unit identifies image and spatial light modulator plane intensities as probability distribution functions and maps each block of the image plane on the particular spatial light modulator region via backpropagation in the manner that arbitrary image plane probability distribution function is mapped to a uniform spatial light modulator plane probability distribution function.

4. The holographic image display system as set forth in claim 1, wherein the processing unit associates each vertex at the common corners/edges of a plurality of image blocks on the image plane with a spatial light modulator vertex at the common corners/edges of a plurality of spatial light modulator regions, each of the regions corresponding to the analogously same image block on the image plane.

5. The holographic image display system as set forth in claim 4, wherein the processing unit associates each vertex connecting respective lateral edges of a number of image blocks on the image plane with a spatial light modulator vertex connecting analogously same lateral edges of a number of spatial light modulator regions.

6. The holographic image display system as set forth in claim 4, wherein, for each vertex on the image plane resulting from the division of the target image into blocks, the processing unit finds a corresponding vertex point on the plane of the spatial light modulator such that the mapping between the image blocks and spatial light modulator regions lead to a substantially uniform distribution of energy.

7. The holographic image display system as set forth in claim 1, wherein the processing unit divides the image plane into a plurality of rectangular image blocks.

8. The holographic image display system as set forth in claim 1, wherein the processing unit divides the image plane into a plurality of hexagonal image blocks.

9. The holographic image display system as set forth in claim 1, wherein the processing unit divides the image plane into a plurality of triangular image blocks.

10. The holographic image display system as set forth in claim 1, wherein the processing unit divides the image plane into a plurality of rectangular, hexagonal, triangular image blocks or a combination thereof.

11. The holographic image display system as set forth in claim 1, wherein the processing unit designs a phase function comprising an aberrated, astigmatic, off-axis lens term for each of the blocks.

12. The holographic image display system as set forth in claim 11, wherein the phase function designed for each image block performs a function of prisms with separate tilt angles.

13. The holographic image display system as set forth in claim 11, wherein the phase function designed for each image block performs a function of lenses with separate focal lengths.

14. The holographic image display system as set forth in claim 1, wherein the phase function includes linear, quadratic or higher order higher-order polynomial terms.

15. The holographic image display system as set forth in claim 1, wherein the processing unit generates a CGH by performing a Fourier transform, Fresnel transform and/or fractional Fourier transform on the target image multiplied by the designed phase function.

16. The holographic image display system as set forth in claim 1, wherein the regions on the plane of the spatial light modulator have a quadrilateral shape.

17. The holographic image display system as set forth in claim 1, wherein the processing unit configures the spatial light modulator regions for different image blocks in a non-overlapping manner.

18. The holographic image display system as set forth in claim 17, wherein the spatial light modulator has an entire spatial light modulator area, and wherein the spatial light modulator regions altogether cover the entire spatial light modulator area.

19. The holographic image display system as set forth in claim 1, wherein, if the 2D image plane intensity is separable such that it can be expressed as a multiplication of two one-dimensional intensity functions, then the processing unit performs iteration-free plane construction by directly imposing the phase function obtained as the multiplication of the one-dimensional phase functions obtained by integrating the cumulative distribution functions of two one-dimensional separable intensity functions.

20. The holographic image display system as set forth in claim 1, wherein the processing unit imposes an additional phase function on the computer-generated phase hologram to compensate for the aberrations and distortions of non-paraxial optical configurations where Fourier and Fresnel methods are inept for accurate description thereof.

21. The holographic image display system as set forth in claim 20, wherein the processing unit finds the additional phase function by performing a ray trace analysis of the non-paraxial system to obtain the ray angle distribution as a gradient specification on the image plane formed by a point source placed at a center of the plane of the spatial light modulator.

22. The holographic image display system as set forth in claim 21, wherein, for each image vertex, the processing unit determines a ray such that the ray starts from the image vertex and lands on the corresponding vertex point on the plane of the spatial light modulator.

23. The holographic image display system as set forth in claim 22, wherein, for each image block, the processing unit determines four rays and calculates a phase term for each image block such that a surface normal at each vertex is equal to an associated ray angle.

24. The holographic image display system as set forth in claim 22, further comprising a head-wearable device that holds the spatial light modulator.

25. The holographic image display system as set forth in claim 24, wherein the head-wearable device includes an intermediate image plane on which a holographic projection is made.

26. The holographic image display system as set forth in claim 25, wherein an image projected to the intermediate image plane is viewed by eyepiece optics.

27. A method for generating a holographic image, the method comprising:
- phase modulating light from at least one light source using a spatial light modulator, wherein the at least one light source is configured to illuminate the spatial light modulator;
- dividing an image plane into a plurality of image blocks;
- performing a phase function that includes two-dimensional polynomial terms for each of the image blocks;
- performing phase function multiplication, where the image blocks are multiplied by the phase function to obtain an image plane wavefield in the manner that a phase hologram to be written on the spatial light modulator is computed using the image plane wavefield via back-propagation and discarding the magnitude information; and
- mapping, such that each image block of the image plane is mapped on a particular spatial light modulator region on the plane of the spatial light modulator in the manner that the area of each of the spatial light modulator regions is proportional to the energy content of the corresponding image block of the image plane.

* * * * *